Feb. 11, 1947.  C. R. SACCHINI  2,415,607
HYDRAULIC MOTOR MECHANISM
Filed Sept. 25, 1943  3 Sheets-Sheet 1
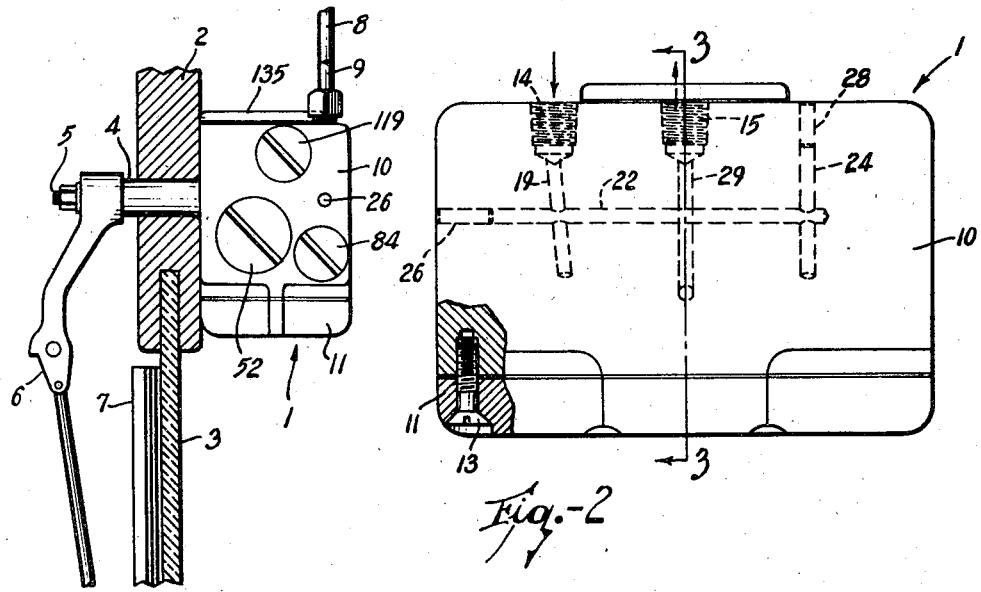
Fig.-1
Fig.-2
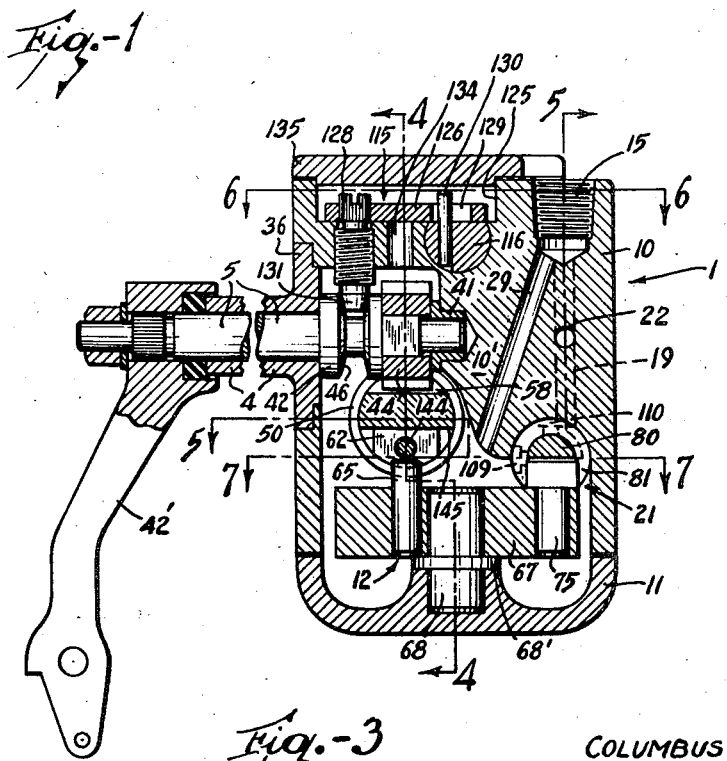
Fig.-3
INVENTOR.
COLUMBUS R. SACCHINI
BY
George M. Soule
ATTORNEY INVENTOR.
COLUMBUS R. SACCHINI
BY
George M. Soule
ATTORNEY Feb. 11, 1947.　　　　C. R. SACCHINI　　　　2,415,607
HYDRAULIC MOTOR MECHANISM
Filed Sept. 25, 1943　　　　3 Sheets-Sheet 3

INVENTOR.
COLUMBUS R. SACCHINI
BY
George M. Soule
ATTORNEY

Patented Feb. 11, 1947

2,415,607

UNITED STATES PATENT OFFICE 2,415,607

HYDRAULIC MOTOR MECHANISM

Columbus R. Sacchini, Euclid, Ohio, assignor to The Marquette Metal Products Company, Cleveland, Ohio, a corporation of Ohio Application September 25, 1943, Serial No. 503,772

8 Claims. (Cl. 121—164)

This invention relates to fluid operated motors, and more particularly to a hydraulic motor designed primarily for use as the prime mover for window or windshield wiping mechanisms.

The hydraulic motor of the present invention is ideally adapted for driving windshield wipers on aircraft and thus meets the many exacting requirements of such installations. For example, since the motor develops a large torque in relation to its size and weight, it can be conveniently installed in crowded airplane cockpits and provide sufficient power to operate the wiper blade or blades in high slip stream and against ice accumulation. The efficiency of the motor is high so that oil consumption is maintained at a low level. Furthermore, the motor is of extremely rugged construction and involves no complicated or delicate mechanisms. The parts can readily be manufactured from the light non-ferrous metals or alloys, and sub-assemblies can be used in the manufacturing process to facilitate mass production. Provision is made so that motors of the same design and using many interchangeable parts may be arranged to produce any desired angle of wiper blade travel throughout a wide range. Furthermore, the angular travel of the wiper blade may be made different on opposite sides of the normal center line of the unit. The motor also incorporates an automatic fluid operated device which locks the power output shaft of the motor against undesired movement such as might be caused, for example, by air stream pressure against the wiper blade when "parked" in certain positions.

An object hereof is to provide a hydraulic motor incorporating the foregoing features and which meets all of the requirements of aircraft installations indicated above and others.

Another object is to provide an improved fluid operated motor.

A further object is to provide a hydraulic motor incorporating an automatic locking or braking mechanism.

Other objects and advantages will become apparent from the following description wherein reference is made to the drawings, in which Fig. 1 is a view showing the hydraulic motor in combination with a windshield wiper mechanism associated with a typical or illustrative airplane windshield section;

Fig. 2 is a rear elevational view of the motor, partly in section;

Fig. 3 is a relatively enlarged sectional view taken generally along the line 3—3 of Figs. 2 and 7;

Figure 4:
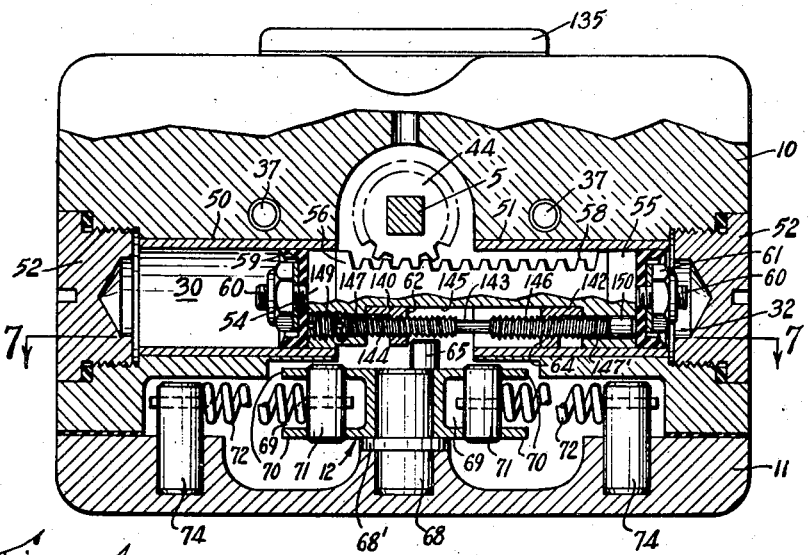
Figure 5:
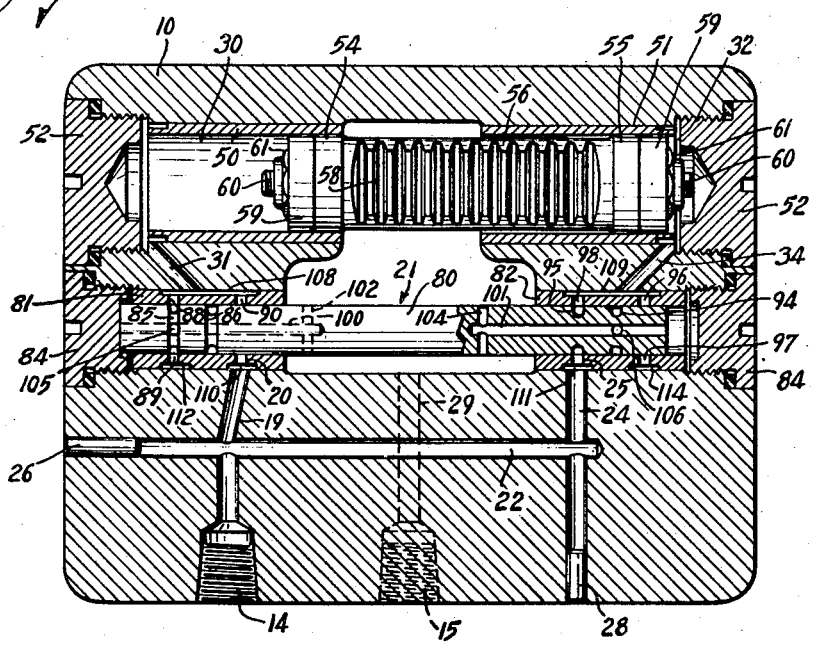
Figure 6:
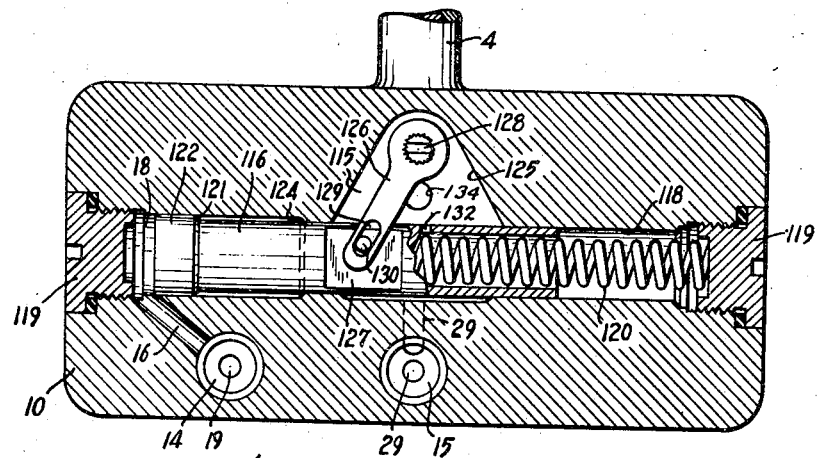
Figure 7:
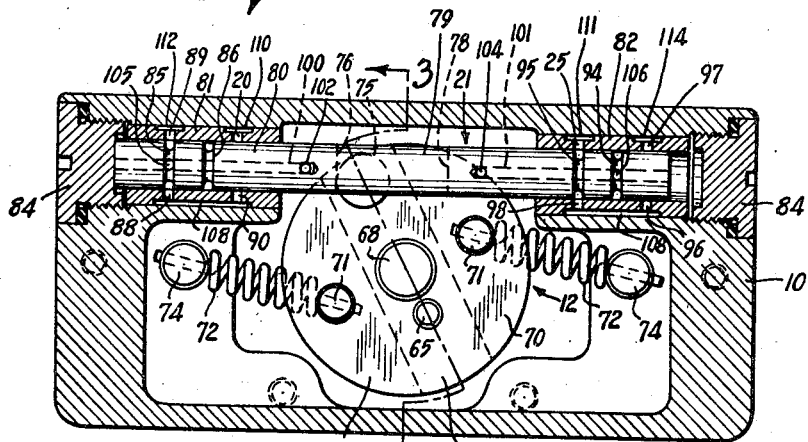

Figs. 4, 5 and 6 are similarly enlarged sectional views taken generally along the lines 4—4, 5—5, and 6—6 of Fig. 3; and Fig. 7 is a similarly enlarged sectional view taken generally along the lines 7—7 of Figs. 3 and 4.

Referring to Fig. 1, the motor 1 of this invention is shown supported on the inside of a top framework 2 of a typical airplane windshield panel 3. A flanged bushing 4 of the motor 1 extends through the framework 2 and rotatably supports a power output shaft 5 to the outer end of which is suitably secured a windshield wiping mechanism assembly 6 including a wiper blade 7. Although the motor 1 is shown in Fig. 1 as arranged to drive a single wiper blade, it is obvious that suitable (e. g.) flexible shafting and cooperating means could be used to cause additional blades to be driven by the motor. A conduit 8 is arranged to supply high pressure fluid to the motor 1 from a suitable source (not shown), and a similar conduit 9 is arranged to provide an exhauster discharge path for fluid from the motor 1.

The motor 1 as shown in detail in Figs. 2 to 7 comprises a generally hollow main body 10 within which the principal working parts of the motor are contained and a lower head member 11 which supports as a sub-assembly a valve shifting (snap action) mechanism 12. The body 10 and member 11 are secured together at a gasketed joint as by means of suitable screws 13 (Fig. 2). The motor will, of course, operate properly in any turned position, hence terms such as upward, downward, left and right etc. are not to be considered restrictive in any sense.

The inlet conduit 8 and the outlet conduit 9 shown in Fig. 1 are screwed into a tapped inlet port 14 and a tapped outlet port 15, respectively. Communicating with the inlet port 14 is a substantially horizontal passage 16 (Fig. 6) which extends to a locking piston chamber 18 and a substantially vertical passage 19 which, in turn, extends to a port 20 at the left hand end (Figs. 5 and 7) of a valve mechanism 21. Intersecting the passage 19 intermediate of its ends is a lateral passage 22 which intersects at its inner end a vertical passage 24 leading to a port 25 at the right hand end of the valve mechanism 21. The passages 22 and 24 are closed at their outer ends by suitable plugs 26 and 28, respectively. A passage 29 extends from the inside of the body 10 through a thickened rear wall portion 10' to the outlet port 15 to provide for venting of the fluid from the interior of the motor housing after it has performed its operating function and wherein it has served to lubricate the relatively moving parts. Fluid is permitted to flow between the left hand end of the valve mechanism 21 and a left hand piston chamber 30 through a passage 31 and between the right hand end of the valve mechanism 21 and a right hand piston chamber 32 through a passage 34. From an examination of the drawings it will be clear that all the fluid passages are so arranged that they may be easily drilled or bored in quantity production with simple tools.

A terminal flange 36 (Fig. 3) of the bushing 4 is received within a complementary opening in the front wall of the body 10 and secured by suitable screws threaded into spaced holes 37 (Fig. 4). The inner end portion of the shaft 5 is rotatably supported in a flanged bushing 41 which is pressed into a socket in the wall portion 10'. Mounted on a non-circular, e. g. squared, portion of the shaft 5 between the bushing 41 and an enlarged portion 42 of the shaft is a pinion 44. An enlarged cylindrical portion 42 of the shaft has a truncated V-shaped annular groove 46 which cooperates with an automatic locking or braking mechanism to be described later.

The piston chambers 30 and 32 are defined by cylindrical liners 50 and 51, respectively, which are pressed into suitable bores in opposed side walls of the body member 10, the bores being closed as by gasketed plugs 52. Slidably received within the piston chambers 30 and 32 are opposed head portions 54 and 55, respectively, of a power piston 56 having an intermediate rack tooth portion 58 in constant mesh with the pinion 44. To the end face of each of the piston heads 54 and 55 is secured a cup-shaped, flexible sliding seal member 59 as by a stud 60 and a nut 61, clearance for the studs 60 being provided by recesses in the respective inner faces of the plugs 52.

The lower side of the piston 56, opposite the rack teeth, is formed or arranged to provide spaced abutment shoulders 62 and 64 for engagement alternately with a swingably supported or eccentric pin 65 of the valve shifting, snap-action mechanism 12. The shoulders 62 and 64 could be end faces of a recess cut into the lower side of the piston, but for certain adjustments, to be described later, the shoulders are movably carried on the piston. The pin 65 extends upwardly from a generally disc-like member 67 rotatably supported on a stub shaft 68 pressed into a socket in a central boss of the head member 11 and having a bearing flange 68'. Diametrically opposed chordal slots 69 in the sides of the disc 67 define pairs of flanges 70 each of which pairs rotatably support a pin 71 extending across the respective slot 69. A diametral opening in each of the pins 71 simply but slidably receives a straight axially directed end portion of a helical spring 72. The other ends of the springs 72 are similarly formed and operatively secured respectively to pins 74 rotatably received in sockets in the head body member 11. The snap-action mechanism 12 is entirely supported by the head member 11 and forms with the member 11 a self-sustaining subassembly.

As clearly shown in Figs. 4 and 7, reciprocation of the piston 56 causes the shoulders 62 and 64 alternately to engage the pin 65 to rotate the disc member 67 from one side to the other of one turned position of the disc member with a snap-action effected by the compressed springs 72 as the springs are brought into dead-center alignment and moved past that position clockwise and counterclockwise.

An upwardly extending pin 75 diametrically disposed with respect to the pin 65 and near the peripheral edge of the disc member 67 is arranged to engage alternately shoulders 76 and 78 (Fig. 7) defined by a cut-away portion 79 of a valve plunger member 80 of the valve mechanism 21. The member 80 (Figs. 5 and 7) is slidably supported at opposite ends within a pair of liners 81 and 82 pressed into opposed bores in thickened section portions of the side walls of the body 10, the bores being closed by suitable gasketed plugs 84. The left hand end portion of the member 80 (Figs. 5 and 7) has an annular groove 85 cooperable with a pair of ports 88 and 89 in the liner 81 and a similar groove 86 cooperable with a port 90 and the port 20 in the liner 81. Likewise the right hand end portion of the plunger has an annular groove 94 cooperable with a pair of ports 96 and 97 in the liner 82 and a similar groove 95 cooperable with a port 98 and the port 25 in the liner 82.

The valve member 80 is drilled from opposite ends to define axial passages 100 and 101 which near their inner ends intersect spaced radial passage 102 and 104, respectively. A radial passage 105 extends from the groove 85 to the passage 100 and a radial passage 106 extends from the groove 94 to the passage 101.

A longitudinal recess 108 in the outer periphery of the liner 81 interconnects the ports 88 and 90 with the passage 31, and a similar recess 109 in the periphery of the liner 82 interconnects the ports 96 and 98 with the passage 34. The ports 20 and 25 have counterbored portions 110 and 111, respectively, at the point of junction with the passages 19 and 24, respectively, and the ports 89 and 97 have counterbored portions 112 and 114 at their outer ends, respectively, to permit fluid to flow freely therethrough into the interior of the motor housing.

An automatic locking mechanism 115 (Figs. 3 and 6) comprises a skirted piston 116 slidably mounted to reciprocate within a bore 118 in the body 10 which defines the piston chamber 18. The bore 118 is closed at its opposite ends as by gasketed plugs 119. The piston 116 is normally biased to the left (position shown in solid lines in Fig. 6) by a helical spring 120 which bears against the right hand plug 119 and extends within the skirted portion of the piston. A tapered plug seat portion 121 adjacent an enlarged head portion 122 of the piston 116 is thus normally displaced from a complementary tapered valve-seat-constituting surface 124 defined on the wall of the bore 118.

A generally triangular recess 125 in the top wall of the body 10 opens into the central portion of the bore 118, as shown most clearly in Figs. 3 and 6, to permit oscillation of an arm 126 which is splined at one end to a locking screw 128 and which has at its other end an elongated slot 129 surrounding a pin 130 extending upwardly into the recess 125 from a flattened portion 127 of the piston 116. The screw 128 passes through a threaded opening in the top wall of the body 10 and has a tapered inner end 131 normally received within the groove 46 in the shaft 5 frictionally to lock the shaft against rotation.

A port 132 in the skirted portion of the piston 116 permits fluid within the bore 118 behind the piston to flow into the recess 125 from which it is discharged through an opening 134 into the interior of the motor housing. The recess 125 may be closed as by a cover plate 135.

In considering the operation of the motor 1, assume that the piston 56 is in the extreme right hand position as shown in Figs. 4 and 5. Opening of a valve (not shown) in the conduit 8 permits fluid under high pressure to flow through the port 14 and the passage 16 into the piston chamber 18 thereby forcing the locking piston 116 to the right against the bias of the spring 120 until the surface 121 abuts the seat 122. Movement of the piston 116 to the right causes the arm 126 to rotate counterclockwise (Fig. 6) and unscrew the locking element 128 so as to withdraw the tapered portion 131 from the slot 46 and permit free reciprocation of the shaft 5.

Concurrently with the flow of fluid into the piston chamber 18, fluid entering the port 14 flows into the passages 19, 22 and 24. The fluid which enters the portion of the passage 19 beyond the passage 22 becomes static at this time since the inner end of the passage 19 is blocked at the port 20 by the valve member 80. The fluid which enters the passages 22 and 24, however, flows through the port 25, the annular groove 95, the port 98, the recess 109, and the passage 34 into the piston chamber 32 and thereby forces the piston 56 to the left. Movement of this piston 56 to the left effects rotary movement of the shaft 5 due to operative engagement between the rack portion 58 and the pinion 44. At a time preselected by the relative positions of the shoulder 64 and the pin 65 and during movement of the piston 56 to the left, the shoulder 64 engages the pin 65 causing rotation of the disc member 67 and consequent movement thereof through and past its dead center position (Figures 4 and 7).

As the springs 72 drive the member 67 through the dead center position, the pin 75 moves with a snap action to engage the shoulder 78 and flip the valve member 80 to its other position. High pressure fluid from the passage 19 now flows through the port 20, the annular groove 86, the passage 90, the recess 108, and the passage 31 into the piston chamber 30 to return the piston 56 to its original position, consequently causing reverse rotation of the shaft 5. During reverse movement of the piston 52, the shoulder 62 engages the pin 65 and moves the member 67 back through the dead center position causing the pin 75 to move with a snap action and engage the shoulder 76 to return the valve member 80 to its original position. Reciprocation of the piston 52 continues in like manner until high pressure fluid is no longer permitted to flow into the port 14.

As the piston 56 moves from the position shown in the drawings, the fluid in the piston chamber 30 is forced through the passage 31, the recess 108, the port 88, the annular groove 85, the port 89, and the recess 112 into the interior of the motor housing where it serves to lubricate the moving parts. A parallel fluid path to the interior of the housing also exists from the groove 85 through the passages 105, 100, and 102 in the valve member 80. Likewise, during return movement of the piston 56, the fluid in the piston chamber 32 is forced through the passage 34, the recess 109, the port 96, the annular groove 94, the port 97, and the recess 114 into the interior of the motor housing. A parallel fluid discharge path also exists from the groove 94 through the passages 106, 101, and 104. Excess fluid from the interior of the motor housing flows through the passage 29 and port 15 into the exhaust conduit 9. The passages 100 and 101 serve to prevent trapping of fluid at the ends of the valve member 80, respectively, and the diameter thereof may be selected to provide a dash-pot action if desired.

Upon stopping the flow of high pressure fluid to the inlet port 14, the motor ceases operation and the spring 120 forces the locking piston 116 to the left (Fig. 6), thereby pulling the arm 126 clockwise and causing the screw 128 to engage the V-groove 46 and lock the shaft 5 against further movement which might be caused, for example, by air pressure against the wiper blade 7. Although not indicated clearly in the drawings, the piston 116 has a slightly smaller diameter than the piston chamber 18 so that high pressure fluid trapped in the chamber 18 to the left of the piston when fluid supply to the motor is interrupted may flow around the piston 116. However, the clearance between the piston 116 and the chamber 18 is so small that, because of fluid friction, there is no hesitation in the movement of the piston 116 to the right upon initiation of operation. The opening 132 in the skirt of the piston 116 prevents entrapment of fluid on the spring side of the piston, the opening 134 in the top of the body 10 permitting fluid forced through the opening 132 to enter freely into the interior of the motor housing.

The passages 100, 101, 102, and 104 in the valve member 80 prevent trapping of fluid at the ends of the member 80, and act as a dash-pot to reduce percussive impingement or slamming of the member 80 against the plugs 84.

The angular sweep of the wiper blade is controlled by the relative positioning of the shoulders 62 and 64. If the shoulders 62 and 64 are relatively close together a short stroke is obtained, whereas if the shoulders are relatively far apart a long stroke is obtained. To cause the angular travel of the wiper blade to be different on opposite sides of the center line, it is merely necessary to move the arm 42' into different angularly adjusted positions about the axis of the drive shaft 5 as on the spline-serrated outer end of the shaft (Fig. 3).

In Fig. 4 the adjustment for drive shaft stroke and which enables, for example, the angular travel of a wiper arm on the drive shaft 5 to be adjusted, comprises a pair of blocks 140 and 142 which blocks support the abutment or shoulder surfaces 62 and 64 for engagement with the pin 65 of the snap action mechanism 12, and a block supporting and adjusting screw 143 eccentric to the axis of the power piston. The adjusting screw has right and left hand threaded portions 144 and 146 threaded to the blocks, and the blocks have flat faces at one side sufficiently close to (as in sliding contact with) a surface such as 145 of the power piston 56 so that the blocks are prevented from being turned out of position. The two ends of the screw 143 are supported for rotation in close fitting but non-threaded aligned bores 147 and 147' parallel to the power piston axis. The outer end of one bore (147 as shown) has a removable screw plug 149 which enables the adjacent slotted end of the screw 143 to be reached for simultaneous adjustment of the blocks toward and away from each other by the screw threads. The plug 149 can be jammed against the adjacent end of the screw to maintain the adjustment of the blocks when the latter are moved to the desired position. The plug 149 is accessible before the associated flexible seal assembly (59, 61) is secured to the power piston. Movement of the screw 143 to the right is blocked by a plug 150 having, for example, a drive fit in the bore 147'. The blocks 140 and 142 could, of course, be supported on individually turnable screws, each having a locking plug in its respective supporting bore in the power piston.

I claim:
1. A hydraulic motor comprising a body formed with a bore providing a pair of opposed cylinders and a further bore providing a pair of valve chambers, said body being formed with fluid supplying passages and passages extending between said bores, pistons mounted for reciprocation within said cylinders and connected to move in synchronism, a valve member mounted for reciprocation within said chambers to control thereby the flow of fluid between said fluid supplying passages and said passages extending between said bores, a valve actuator rotatable in opposite directions about a pivot fixed with relation to the body, a laterally apertured pin pivotally mounted on the actuator, a laterally apertured pin pivotally mounted on the body, and a compression coil spring having end portions beyond the coils entering respective apertures of the pins, said spring acting to move the actuator through a dead center position, an eccentric driving connection between said piston and said valve actuator, and an eccentric driving connection between said valve actuator and said valve member.

2. A hydraulic motor comprising a substantially hollow body member open on one side and formed with a pair of parallel cylinder bores, a piston reciprocatably received within one of said bores, a shaft operatively connected with said piston and driven thereby, said body member being formed with passages for the flow of fluid under pressure and for the distribution of said fluid to and from said one of said cylinder bores, a valve plunger reciprocatively received within the other of said bores and operable for regulating the flow of fluid to and from said one of said bores thereby to control the operation of said piston, a head body member closing said open side of said body member, and a valve shifting lever pivotally supported within the hollow body member by said head body member on a pivot axis lying between said parallel bores and operatively associated with said piston for actuation upon reciprocating movement of said piston, said valve shifting lever including means for effecting operation of said valve plunger.

3. The combination with a hydraulic motor having a power take-off shaft driven with alternate rotary motion by a piston reciprocatable within a cylinder, of a brake mechanism for said shaft including a brake operating piston and a screw operated thereby into and out of braking contact with the shaft, said brake operating piston being normally biased to braking position, a cylinder for said brake piston, and means defining passages for the concurrent conduction of operating fluid under pressure to both of said cylinders.

4. The combination with a hydraulic motor having a power take-off shaft driven with alternate rotary motion by a piston reciprocatable within a cylinder, of a brake mechanism for said shaft including a brake piston normally biased to braking position and a friction brake operatively connected with the piston and engaging the shaft, a cylinder for said brake piston, means defining passages for the concurrent conduction of operating fluid under pressure to both of said cylinders, and a valve means interposed in said passages leading to said first cylinder.

5. In a hydraulic motor, a rotatable power-output shaft driven by a reciprocable double-ended piston controlled by an automatic reversing valve mechanism actuated by the piston, a brake mechanism comprising a brake means arranged frictionally to engage said shaft, a brake operating piston, a cylinder for said operating piston, means interposed between said operating piston and said brake means for operating said brake means in accordance with the position of said operating piston, means normally biasing said operating piston to a brake applying position, means defining fluid passages for conducting high pressure fluid to said cylinder to move said operating piston against said biasing means thereby to release said brake.

6. A mechanism in accordance with claim 5 characterized in that clearance is provided between said operating piston and said cylinder sufficient for fluid to pass around said piston during return of said piston to the normal position but insufficient to delay appreciably movement of said piston from the normal position.

7. In a reciprocating fluid operated motor having an oscillating power output shaft, means to supply operating fluid to the motor, said means operating to cause continued oscillation of the shaft, a spring operated brake associated with the shaft to stop it, and fluid operated means arranged to overcome the action of the brake operating spring and hold the brake released so long as operating fluid is supplied to the motor.

8. In a fluid operated motor, a reversibly acting piston mechanism including fluid supply passage means and reversing valve means operatively associated therewith for causing continued reciprocation of the piston, a power output shaft in geared relationship to the piston for oscillation thereby, a screw arranged operatively to engage and disengage the shaft, fluid operated mechanism normally continuously supplied by fluid from said fluid passage means, said fluid operated mechanism being connected with the screw in a manner to turn the same in a direction to cause the screw to disengage the shaft, and means operating consequent upon cessation of fluid supply to the fluid passage means to cause the screw to engage the shaft.

COLUMBUS R. SACCHINI.

REFERENCES CITED

The following references are of record in the file of this patent:

UNITED STATES PATENTS

| Number | Name | Date |
| --- | --- | --- |
| 1,993,612 | Lum | Mar. 5, 1935 |
| 1,194,783 | Rennerfelt | Aug. 15, 1916 |
| 1,776,765 | Ferris | Sept. 23, 1930 |
| 1,208,554 | Helmholtz et al. | Dec. 12, 1916 |
| 1,503,280 | Osbourne | July 29, 1924 |
| 2,243,656 | Shannon | May 27, 1941 |
| 1,910,019 | Kelly | May 23, 1933 |
| 2,235,544 | Wold | Mar. 18, 1941 |
| 2,265,307 | Orshansky | Dec. 9, 1941 |
| 1,129,741 | Shannon | Feb. 23, 1915 |
| 746,158 | Reed | Dec. 8, 1903 |
| 111,624 | Fogarty | Feb. 7, 1871 |
| 494,207 | Kendrick | Mar. 28, 1893 |
| 551,024 | Wright | Dec. 10, 1895 |
| 606,480 | Doherty | June 28, 1898 |
| 1,661,466 | Cook | Mar. 6, 1928 |

FOREIGN PATENTS

| Number | Country | Date |
| --- | --- | --- |
| 587,610 | French | Jan. 20, 1925 |
| 290,024 | German | Feb. 2, 1916 |